(12) United States Patent
Galton et al.

(10) Patent No.: US 11,752,922 B1
(45) Date of Patent: Sep. 12, 2023

(54) METHOD AND IMPLEMENT FOR LOAD SECUREMENT

(71) Applicants: Andrew Galton, Calgary (CA); Randy Martin, St. Albert (CA); Bruce Murphy, Cluny (CA); Susan Bailey, Taber (CA)

(72) Inventors: Andrew Galton, Calgary (CA); Randy Martin, St. Albert (CA); Bruce Murphy, Cluny (CA); Susan Bailey, Taber (CA)

( * ) Notice: Subject to any disclaimer, the term of this patent is extended or adjusted under 35 U.S.C. 154(b) by 716 days.

(21) Appl. No.: 16/930,636

(22) Filed: Jul. 16, 2020

(51) Int. Cl.
*B60P 7/08* (2006.01)
*B25J 18/02* (2006.01)
*B25J 1/04* (2006.01)
*B60P 7/12* (2006.01)

(52) U.S. Cl.
CPC ............... *B60P 7/0853* (2013.01); *B25J 1/04* (2013.01); *B25J 18/025* (2013.01); *B60P 7/12* (2013.01)

(58) Field of Classification Search
CPC .. B60P 7/0853; B60P 7/12; B60P 7/04; B60P 7/0876; B25J 1/04; A47F 13/06
USPC ........ 410/96, 97, 98, 99, 100, 156; 15/144.4
See application file for complete search history.

(56) References Cited

U.S. PATENT DOCUMENTS

| | | | |
|---|---|---|---|
| 4,832,393 A | 5/1989 | Pitchford | |
| 5,608,951 A | 3/1997 | Chou | |
| 6,767,169 B2 | 7/2004 | Zhan et al. | |
| 6,808,346 B2 | 10/2004 | Zhan et al. | |
| 6,820,906 B1 | 11/2004 | McClendon | |
| 7,044,700 B2 * | 5/2006 | Tessier .................. | B60P 7/0876 410/103 |
| 8,376,673 B2 * | 2/2013 | Komarnisky ......... | B60P 7/0853 410/97 |
| 9,931,533 B2 | 4/2018 | Ingram | |
| 9,962,572 B2 | 5/2018 | Ingram et al. | |
| 2004/0052604 A1 * | 3/2004 | Lambie ................. | B65B 13/025 410/97 |
| 2009/0274530 A1 * | 11/2009 | Goodfellow .......... | B60P 7/0853 410/98 |

* cited by examiner

*Primary Examiner* — Stephen T Gordon
(74) *Attorney, Agent, or Firm* — CRAMER PATENT & DESIGN, PLLC; Aaron R. Cramer (57) ABSTRACT

A load securement device may comprise an extendable pole and a plurality of attachments. The device may be operable to manipulate a tie down of a cargo trailer. As non-limiting examples, the tie down may be a cargo strap, a cargo chain, or an elastic cord used to secure a cargo or to secure a tarp over the cargo. The extendable pole may be lengthened to reach the top of the cargo. The extendable pole may be shortened to take up less space for storage. The plurality of attachments may alter a distal end of the extendable pole to enable the extendable pole to perform multiple tasks necessary for securing the cargo. As non-limiting examples, the plurality of attachments may enable the extendable pole to toss the cargo strap, to pull the cargo strap, or lift a hard corner.

19 Claims, 12 Drawing Sheets

METHOD AND IMPLEMENT FOR LOAD SECUREMENT

RELATED APPLICATIONS

None.

FIELD OF THE INVENTION

The presently disclosed subject matter is directed to a method and implement for load securement.

BACKGROUND OF THE INVENTION

Ratchet clamp down straps for moving and securing objects are indispensable when compared to regular ropes. These straps provide a large amount of holding force, are easily tightened and loosened, and remain safely secured even when subject to vibration, weather elements, shifting loads and the like. However useful as these ratchet straps are, they are somewhat difficult to apply, especially over large objects. Their relative light weight makes it difficult to throw the one end over the load when weighted down with the remainder of the strap.

Such action typically means many repeated tries resulting in wasted time, higher costs, aggravation, and even possible safety/medical issues. In fact, their difficulty to apply means that an adequate number of them may not be used resulting in a safety risk when a load is transported. These same problems exist when applying tarps, fastening down reels with chains, applying hard protective corners, and other similar processes. Accordingly, there exists a need for a means by which ratcheting cargo straps and other loads securing devices, can be easily applied to flatbed trailer loads without the disadvantages as described above. The development of the method and implement for load securement fulfills this need.

SUMMARY OF THE INVENTION

The principles of the present invention provide for a tie down placement device which comprises an extendable pole which is lengthened to reach over a plurality of cargo. The extendable pole has a bottom pole section, an intermediate pole section, and a top pole section. The top pole section includes an attachment aperture. The tie down placement device also comprises a plurality of attachments each altering a distal end of the extendable pole to enable the extendable pole to perform one of a plurality of tasks necessary for securing the cargo. The tie down placement device also comprises an intermediate locking pin which is located on a proximal end of the intermediate pole section to engage a bottom locking aperture which is located at a proximal end of the bottom pole section when the intermediate pole section is extended such that the intermediate locking pin and the bottom locking aperture align. The tie down placement device also comprises a top locking pin which is located on a proximal end of the top pole section to engage an intermediate locking aperture located at a distal end of the intermediate pole section when the top pole section is extended such that the top locking pin and the intermediate locking aperture align. The tie down placement device also comprises a hook which is located on the distal half of the top pole section to manipulate a tie down. One of the attachments are removably coupled to a distal end of the top pole section via the attachment aperture.

The bottom pole section, the intermediate pole section, and the top pole section may telescopically couple such that the top pole section may slide within the intermediate pole section and the intermediate pole section may slide within the bottom pole section. The top pole section may be smaller than the inside dimensions of the intermediate pole section and the outer dimensions of the intermediate pole section may be smaller than the inside dimensions of the bottom pole section. The bottom pole section, the intermediate pole section, and the top pole section may lock into place to prevent the extendable pole from collapsing when extended. The bottom pole section may include a grip for a person to hold the distal end of the extendable pole.

The extendable pole may be shortened to take up less space for storage. The length of the extendable pole when fully extended may be at least eight feet six inches. The attachments may alter the distal end of the extendable pole to enable the extendable pole to perform one of the tasks necessary for securing the cargo. The attachments may enable the extendable pole to toss a cargo strap, to pull the cargo strap, or lift a hard corner of the cargo. The intermediate locking pin may prevent further movement of the intermediate pole section relative to the bottom pole section until the intermediate locking pin is disengaged from the bottom locking aperture. The intermediate locking pin may disengage the bottom locking aperture when the intermediate locking pin is pressed towards the center of the intermediate pole section while sliding the intermediate pole section to misalign the intermediate locking pin and the bottom locking aperture. The top locking pin may prevent further movement of the top pole section relative to the intermediate pole section until the top locking pin is disengaged from the intermediate locking aperture.

The top locking pin may disengage the intermediate locking aperture when the top locking pin is pressed towards the center of the top pole section while sliding the top pole section to misalign the top locking pin and the intermediate locking aperture. The hook may be a pair of hooks with a first open gap facing the distal end of the extendable pole and a second open gap facing the proximal end of the extendable pole. The hook may be a nautical cleat hook. One of the attachments may be a loop attachment or a scoop attachment. The tie down placement device may manipulate the tie down of the cargo trailer. The tie down may be a device selected from the group consisting of a cargo strap, a cargo chain, or an elastic cord.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 100 tie down placement device
- 200 extendable pole
- 202 distal end
- 204 proximal end
- 220 bottom pole section
- 222 grip
- 224 bottom locking aperture
- 230 top pole section
- 234 hook
- 236 attachment aperture
- 238 top locking pin
- 240 top locking aperture
- 250 intermediate pole section
- 254 intermediate locking pin
- 256 intermediate locking aperture
- 264 attachment base
- 266 attachment locking pin
- 270 loop attachment
- 272 loop
- 276 pivot rearwards
- 278 spring forwards
- 280 scoop attachment
- 282 scoop
- 284 spring
- 286 pivot
- 290 fork attachment
- 292 fork
- 296 one or more front prongs
- 298 one or more rear prongs
- 300 load measurement attachment
- 301 load measurement housing
- 302 rod
- 303a rod first segment
- 303b rod second segment
- 304a first hinge
- 304b second hinge
- 310 clamp
- 315 catch
- 316 gap
- 350 tape measure
- 351 tape measure housing
- 352 tape
- 353 tape measure tab
- 900 cargo trailer
- 910 tie down
- 912 tie down hook
- 920 tarp
- 922 hard corner
- 930 cargo
- 932 cargo spool
- 934 pipe
- 950 user

1. DESCRIPTION OF THE INVENTION

The present invention is directed to a tie down placement device 100. The tie down placement device 100 (hereinafter invention) may comprise an extendable pole 200 and a plurality of attachments. The invention 100 may be operable to manipulate a tie down 910 of a cargo trailer 900. As non-limiting examples, the tie down 910 may be a cargo strap, a cargo chain, or an elastic cord used to secure a cargo 930 or to secure a tarp 920 over the cargo 930. The extendable pole 200 may be lengthened to reach the top of the cargo 930. The extendable pole 200 may be shortened to take up less space for storage. The plurality of attachments may alter a distal end 202 of the extendable pole 200 to enable the extendable pole 200 to perform multiple tasks necessary for securing the cargo 930. As non-limiting examples, the plurality of attachments may enable the extendable pole 200 to toss the cargo strap, to pull the cargo strap, or lift a hard corner 922.

The extendable pole 200 may comprise a bottom pole section 220, an intermediate pole section 250, and a top pole section 230. The bottom pole section 220 may be located at a proximal end 204 of the extendable pole 200, the top pole section 230 may be located at the distal end 202 of the extendable pole 200, and the intermediate pole section 250 may be located between the bottom pole section 220 and the top pole section 230. The bottom pole section 220, the intermediate pole section 250, and the top pole section 230 may telescopically couple such that the top pole section 230 may slide within the intermediate pole section 250 and the intermediate pole section 250 may slide within the bottom pole section 220. Specifically, the outer dimensions of the top pole section 230 may be smaller than the inside dimensions of the intermediate pole section 250 and the outer dimensions of the intermediate pole section 250 may be smaller than the inside dimensions of the bottom pole section 220.

Figure 1:
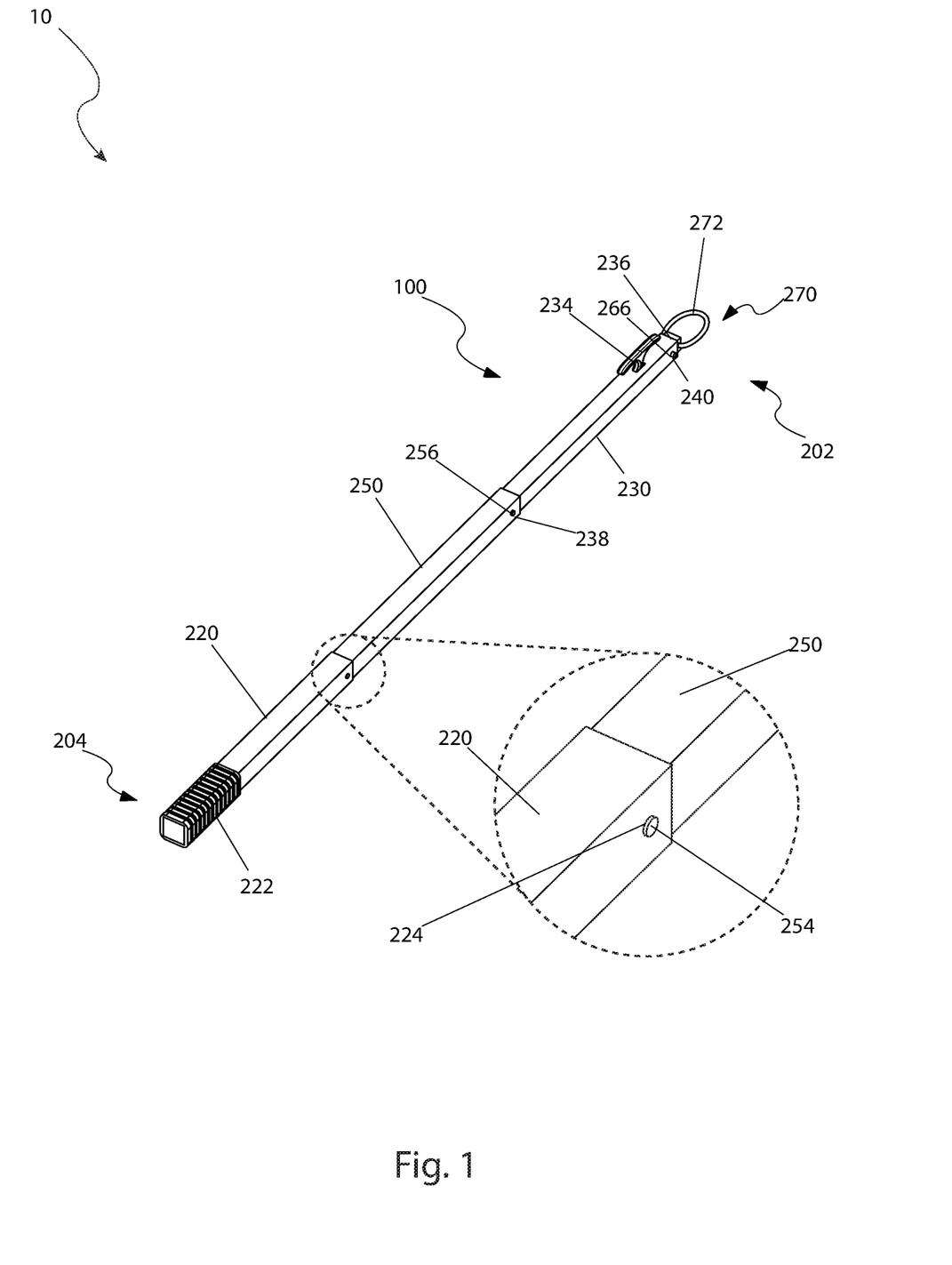
FIG. 1 is an isometric view of a tie down placement device, according to an embodiment of the present invention, illustrating an extendable pole with a loop attachment coupled to the pole.
Figure 2:
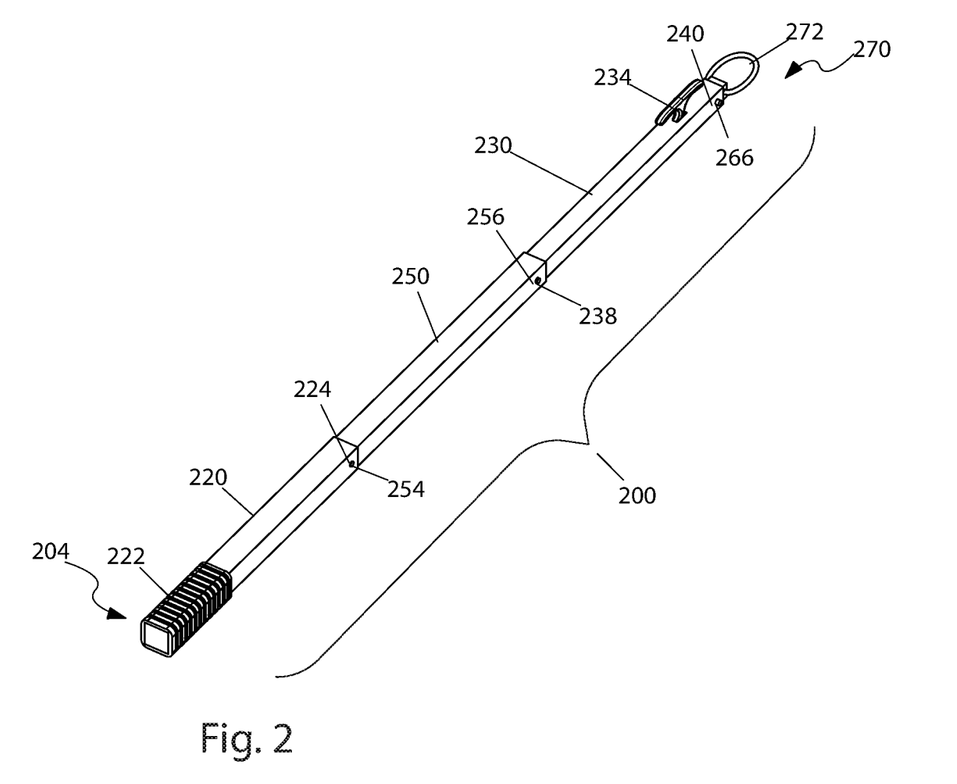
FIG. 2 is a side view of an extendable pole and loop attachment, according to an embodiment of the present invention.
Figure 3:
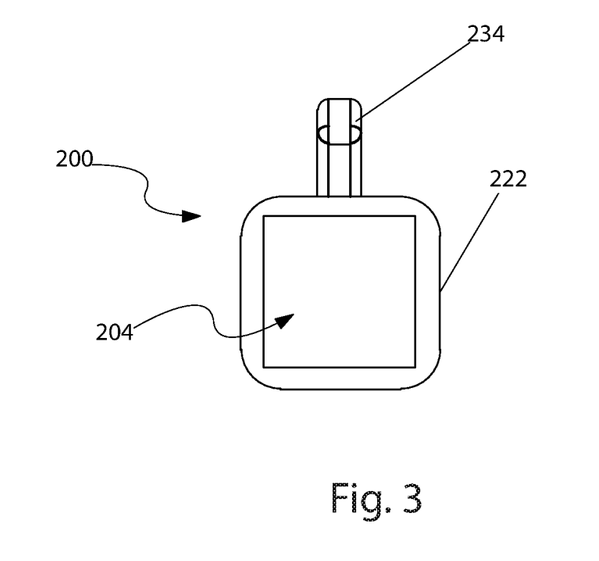
FIG. 3 is a proximal end view of an extendable pole, according to an embodiment of the present invention.

As shown in FIG. 1 and FIG. 2, the bottom pole section 220, the intermediate pole section 250, and the top pole section 230 may lock into place to prevent the extendable pole 200 from collapsing when extended. An intermediate locking pin 254 located on the proximal end of the intermediate pole section 250 may engage a bottom locking aperture 224 located at the distal end of the bottom pole section 220 when the intermediate pole section 250 is extended such that the intermediate locking pin 254 and the bottom locking aperture 224 align. The intermediate locking pin 254 may prevent further movement of the intermediate pole section 250 relative to the bottom pole section 220 until the intermediate locking pin 254 is disengaged from the bottom locking aperture 224. The intermediate locking pin 254 may disengage the bottom locking aperture 224 when the intermediate locking pin 254 is pressed towards the center of the intermediate pole section 250 while sliding the intermediate pole section 250 to misalign the intermediate locking pin 254 and the bottom locking aperture 224. FIG. 3 shows a view of the extendable pole 200 from the proximal end 204.

In a preferred embodiment, the length of the extendable pole 200 when fully extended may be at least eight feet six inches (8 ft. 6 in.).

A top locking pin 238 located on the proximal end of the top pole section 230 may engage an intermediate locking aperture 256 located at the distal end of the intermediate pole section 250 when the top pole section 230 is extended such that the top locking pin 238 and the intermediate locking aperture 256 align. The top locking pin 238 may prevent further movement of the top pole section 230 relative to the intermediate pole section 250 until the top locking pin 238 is disengaged from the intermediate locking aperture 256. The top locking pin 238 may disengage the intermediate locking aperture 256 when the top locking pin 238 is pressed towards the center of the top pole section 230 while sliding the top pole section 230 to misalign the top locking pin 238 and the intermediate locking aperture 256. The bottom pole section 220 may comprise a grip 222. The grip 222 may be adapted to be a grasping area for a user 950 to hold the proximal end 204 of the extendable pole 200.

The top pole section 230 may comprise a hook 234. The hook 234 may be located on the exterior of the top pole section 230 on the distal half of the top pole section 230. The hook 234 may be operable to manipulate the tie down 910. In some embodiments, the hook 234 may be a double hook with a first open gap facing the distal end 202 of the extendable pole 200 and a second open gap facing the proximal end 204 of the extendable pole 200. As a non-limiting example, the hook 234 may be a nautical cleat hook.

The top pole section 230 may further comprise an attachment aperture 236. An individual attachment selected from the plurality of attachments may removably couple to the distal end 202 of the top pole section 230 via the attachment aperture 236. As non-limiting examples, the plurality of attachments may comprise a loop attachment 270, a scoop attachment 280 and a fork attachment 290. Each of the individual attachments may comprise an attachment base 264 and an attachment locking pin 266 located within the attachment base 264. The individual attachment may couple to the extendable pole 200 by placing the attachment base 264 into the attachment aperture 236 and sliding the individual attachment into the top pole section 230 such that the attachment locking pin 266 aligns with a top locking aperture 240 located at the distal end 202 of the top pole section 230. When aligned, the attachment locking pin 266 may engage the top locking aperture 240 and may retain the individual attachment on the top pole section 230. The attachment locking pin 266 may disengage the top locking aperture 240 when the attachment locking pin 266 is pressed towards the center of the top pole section 230 while sliding the individual attachment to misalign the attachment locking pin 266 and the top locking aperture 240.

The loop attachment 270 may comprise a loop 272 of material coupled to the attachment base 264 of the loop attachment 270. As a non-limiting example, the loop 272 may be a bent wire. The loop attachment 270 may be operable to snag a tie down hook 912 and to pull the tie down hook 912. The loop attachment 270 is shown in FIG. 1 and FIG. 2 at the distal end 202 of the extendable pole 200.

Figure 4:
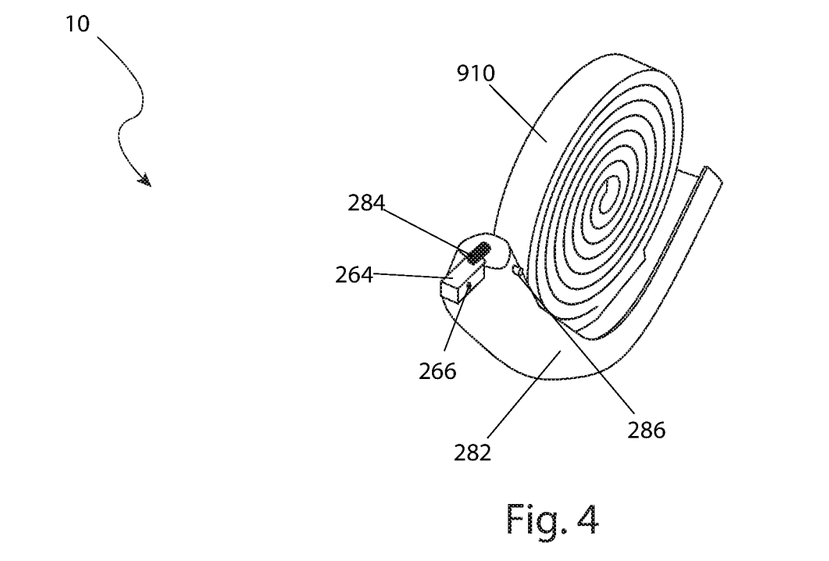
FIG. 4 is an isometric view of a scoop attachment, according to an embodiment of the present invention.
Figure 5:
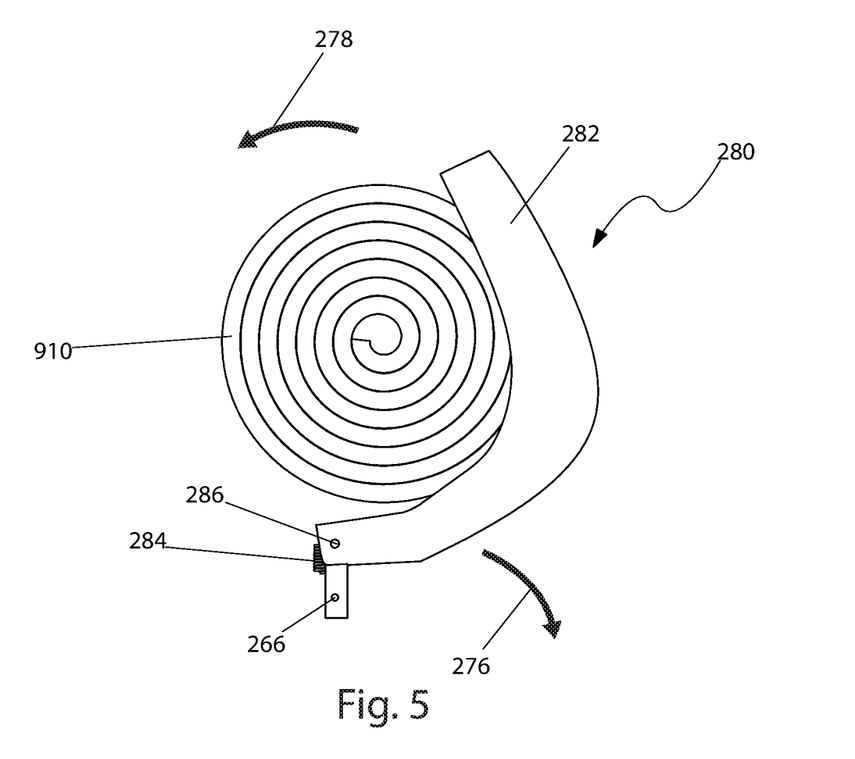
FIG. 5 is a side view of a scoop attachment, according to an embodiment of the present invention.

The scoop attachment 280, show in FIG. 4 and FIG. 5, may comprise a scoop 282 pivotably coupled to the attachment base 264 of the scoop attachment 280 via a pivot 286 and a spring 284 coupling the attachment base 264 to the scoop 282. The scoop 282 may be a concave surface with the open face of the scoop 282 directed perpendicular to the axis of the extendable pole 200. The scoop attachment 280 may be operable to propel the tie down 910 that is placed in the scoop 282 forward. The pivot 286 and the spring 284 may permit the scoop 282 to pivot rearwards 276 under the influence of an external force and to spring forwards 278 when the external force is removed. As a non-limiting example, the user 950 may hold the extendable pole 200 in an elevated position and may swing the top of the extendable pole 200 away from the cargo 930 and then reverse the direction of the extendable pole 200. Inertia from the rearwards motion may cause the scoop 282 to pivot rearwards 276. As the top of the extendable pole 200 travels forwards, the spring 284 may cause the scoop 282 to spring forwards 278, imparting additional momentum to the scoop 282. The user 950 may stop forward motion before striking the cargo 930 and the tie down 910 may be thrown forward and over the top of the cargo 930.

Figure 6:
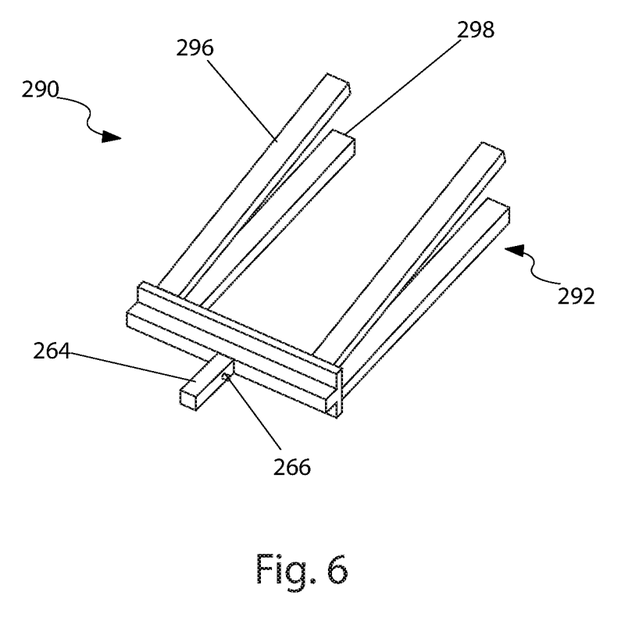
FIG. 6 is an isometric view of a fork attachment, according to an embodiment of the present invention.
Figure 7:
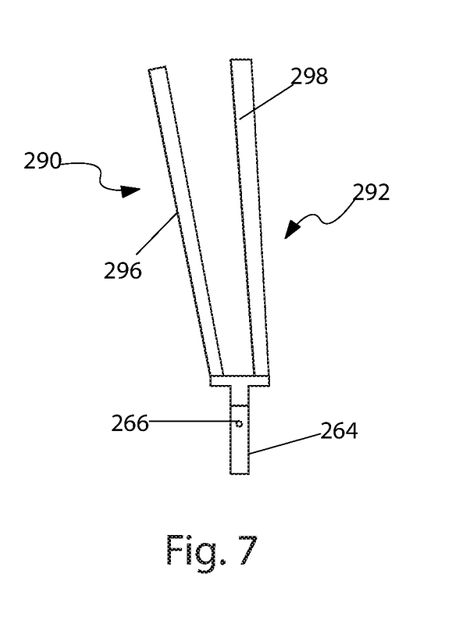
FIG. 7 is a side view of a fork attachment, according to an embodiment of the present invention.

The fork attachment 290, shown in FIG. 6 and FIG. 7, may comprise a fork 292 coupled to the attachment base 264 of the fork attachment 290. The fork 292 may be an armature comprising two (2) or more prongs. The two (2) or more prongs may comprise one (1) or more front prongs 296 and one (1) or more rear prongs 298. The fork attachment 290 may be operable to lift the hard corner 922 to the top of the cargo 930 by sliding the hard corner 922 between the one or more front prongs 296 and the one or more rear prongs 298.

Figure 8:
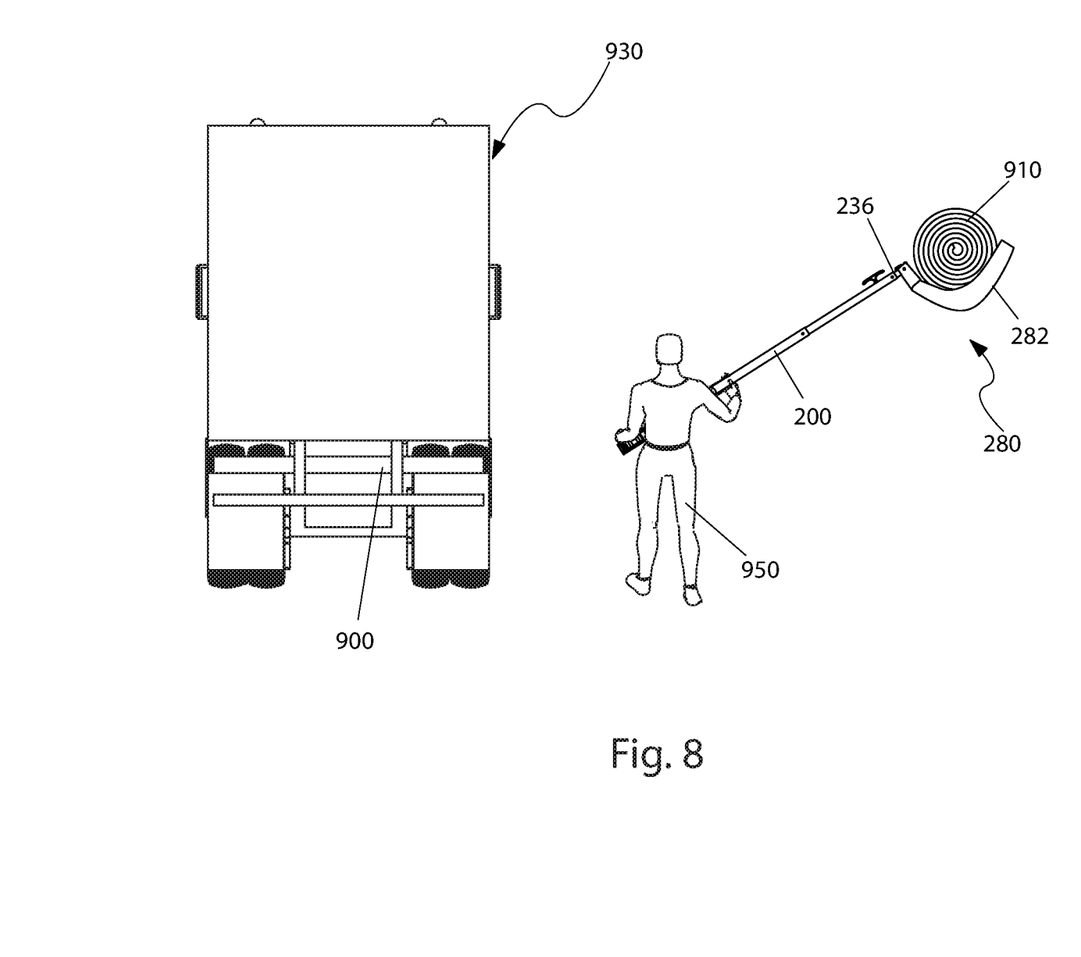
FIG. 8 is an in-use view of a tie down placement device, according to an embodiment of the present invention, illustrating the extendable pole and scoop attachment propelling a tie down over the top of a cargo.

Referring now to FIG. 8, the invention 100 may be operable to propel a cargo strap over the top of a cargo 930. As a non-limiting example, a user 950 may couple a scoop attachment 280 to an attachment aperture 236 at a distal end 202 of an extendable pole 200. The user 950 may stand to one side of a cargo trailer 900 with a tie down 910 folded or coiled and placed in a scoop 282 of the scoop attachment 280. As a non-limiting example, the tie down 910 may be the cargo strap. The user 950 may lift the extendable pole 200 and may rotate the top of the extendable pole 200 rapidly towards the cargo trailer 900, ejecting the cargo strap from the scoop 282 except for one end of the cargo strap which may be hooked to the scoop attachment 280 or to the extendable pole 200. The cargo strap may travel over the top of the cargo 930 unraveling along the way. The ejected end of the cargo strap may hang down on the far side of the cargo 930 while the end of the cargo strap that was hooked to the scoop attachment 280 or the extendable pole 200 may be pulled down on the near side of the cargo trailer 900.

Figure 9A:
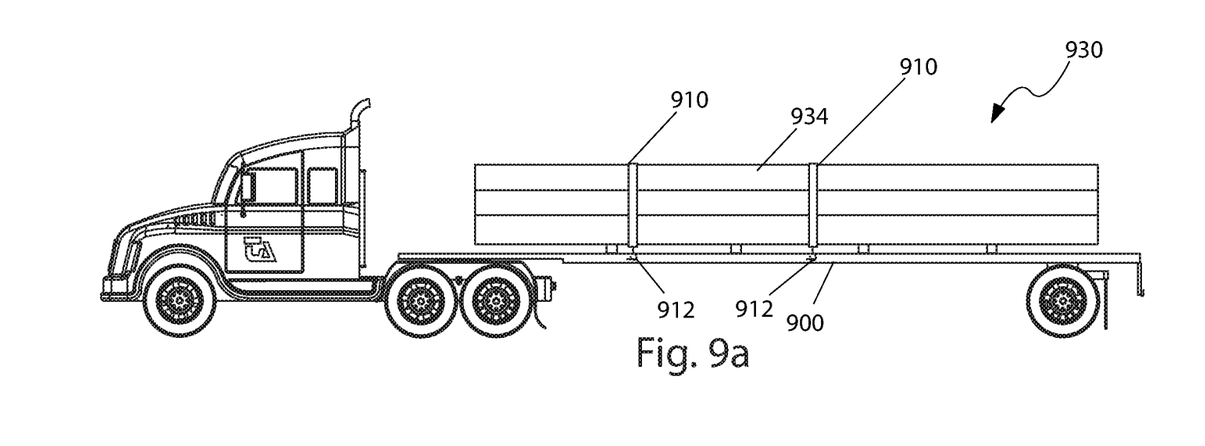
FIG. 9A is an in-use view of a cargo comprising pipe loaded onto a cargo trailer, according to an embodiment of the present invention.
Figure 9B:
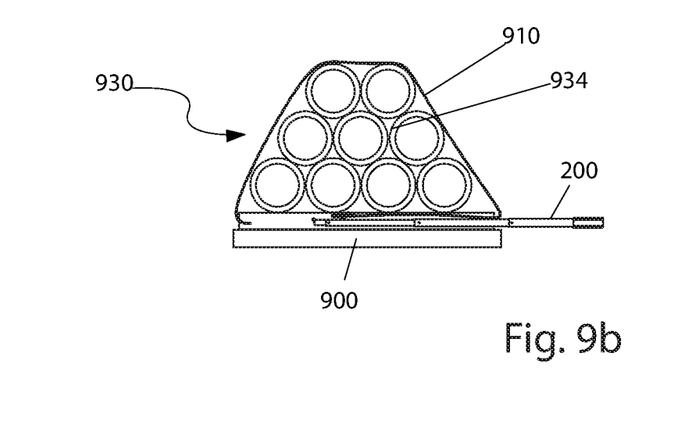
FIG. 9B is an in-use view of an extendable pole pushing a tie down under the cargo, according to an embodiment of the present invention.

The invention 100 may be operable to place a cargo strap under a cargo 930. As a non-limiting example, FIG. 9A illustrates that the cargo 930 may be a load of pipe 934 elevated above a cargo trailer 900 by four by four (4x4) lumber. In FIG. 9B, an end of the cargo strap may be coupled to a hook 234 and may pushed under the pipe 934 through the space between the pipe 934 and the cargo trailer 900. Once on the opposite side of the cargo trailer 900, the end of the cargo strap may be pulled to bring more of the cargo strap to the opposite side and the end of the cargo strap may be thrown over the pipe 934. The ends of the cargo strap may be coupled to bind the pipe 934. Alternatively, an extendable pole 200 may be passed beneath the cargo 930 and the end of the cargo strap may be coupled to the hook 234 of the extendable pole 200 and then pulled under the cargo 930.

Figure 10A:
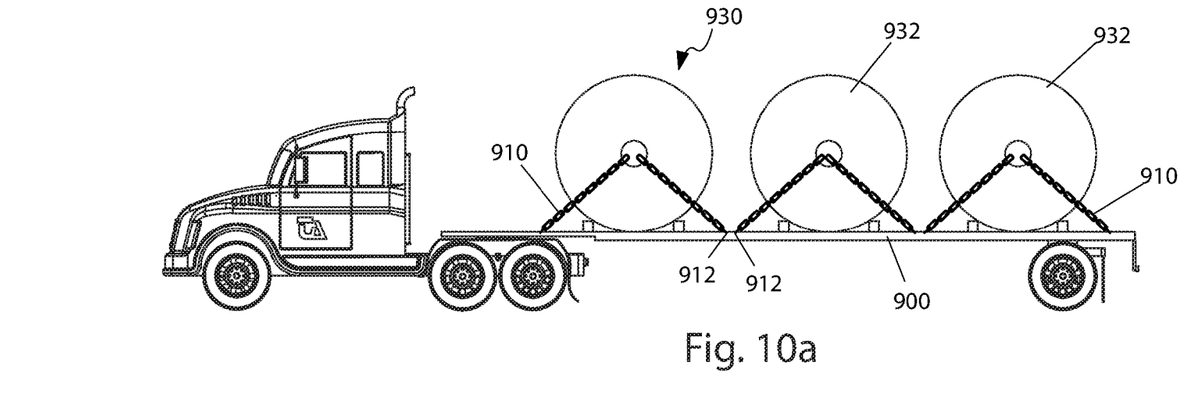
FIG. 10A is an in-use view of a cargo comprising cargo spools loaded onto a cargo trailer, according to an embodiment of the present invention.
Figure 10B:
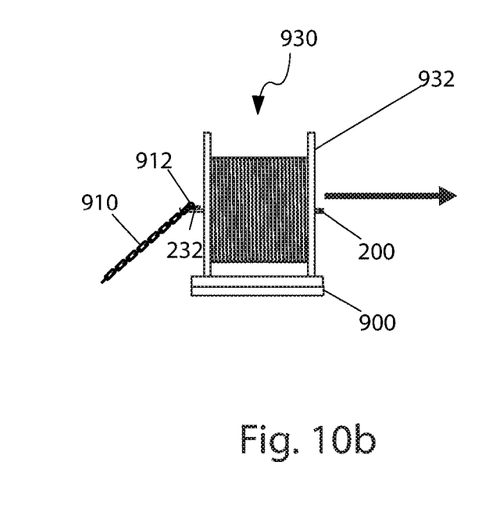
FIG. 10B is an in-use view of an extendable pole pulling a tie down through the center of a cargo spool, according to an embodiment of the present invention.

The invention 100 may be operable to pull a cargo chain through the center of a cargo spool 932. FIG. 10A illustrates the cargo spools 932 loaded onto a cargo trailer 900. As shown in FIG. 10B, an extendable pole 200 may be passed through the open center of the cargo spool 932 and an end of a tie down 910 may be coupled to a hook 232. As a non-limiting example, the tie down 910 may be the cargo chain. The extendable pole 200 may be pulled through the cargo spool 932 to drag the cargo chain to the other side.

Figure 11A:
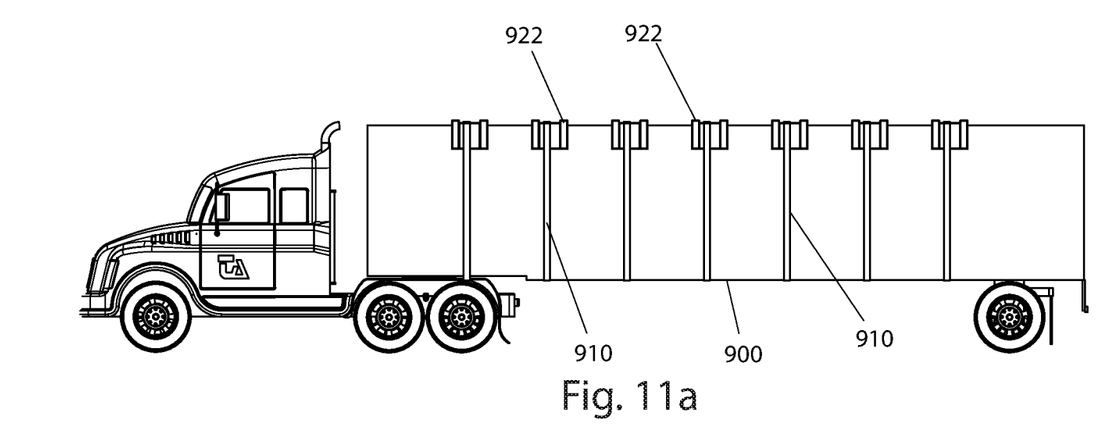
FIG. 11A is an in-use view of a cargo protected by hard corners loaded onto a cargo trailer, according to an embodiment of the present invention.
Figure 11B:
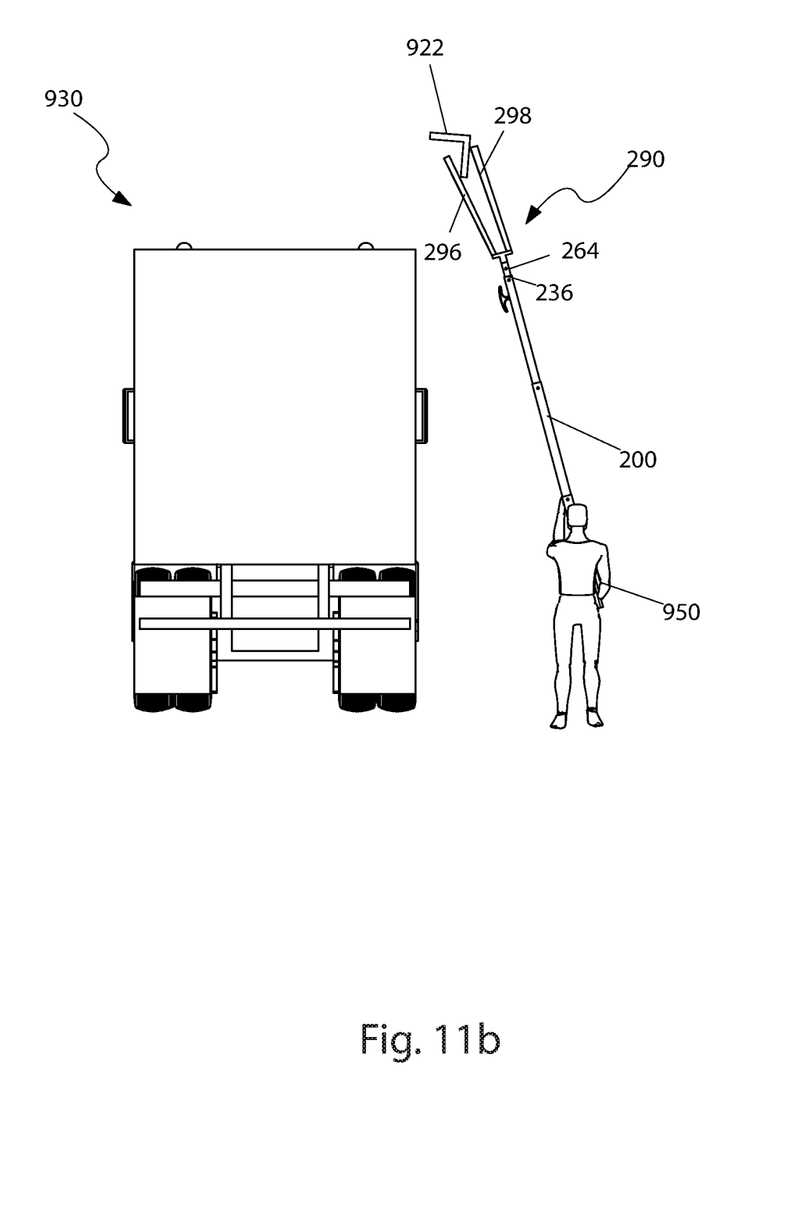
FIG. 11B is an in-use view of an extendable pole lifting a hard corner to the top or the cargo, according to an embodiment of the present invention.

The invention 100 may be operable to lift a hard corner 922 to the top of a cargo 930. FIG. 11A illustrates the cargo 930 on a cargo trailer 900 with the hard corners 922 in place between the cargo 930 and tie downs 910. As a non-limiting example, the tie downs 910 may be cargo straps. The hard corners 922 may protect the cargo 930 from deforming due to pressure from the cargo strap by redistributing the pressure over a wider area. As shown in FIG. 11B, the hard corner 922 may be placed at a top lateral corner of the cargo 930 by coupling a fork attachment 290 to an attachment aperture 236 of an extendable pole 200. The hard corner 922 may be placed into a fork 292 of the fork attachment 290 and lifted to the top of the cargo 930. The hard corner 922 may be positioned such that it rests simultaneously on the top of the cargo 930 and against a side of the cargo 930 and may be released by pulling down on the extendable pole 200 to detach the hard corner 922.

Figure 12A:
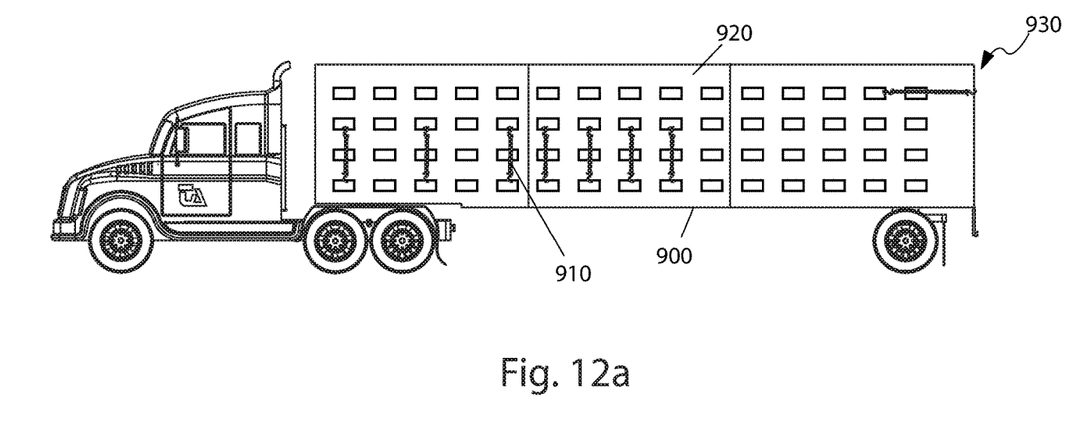
FIG. 12A is an in-use view of a cargo covered by a tarp loaded onto a cargo trailer, according to an embodiment of the present invention.
Figure 12B:
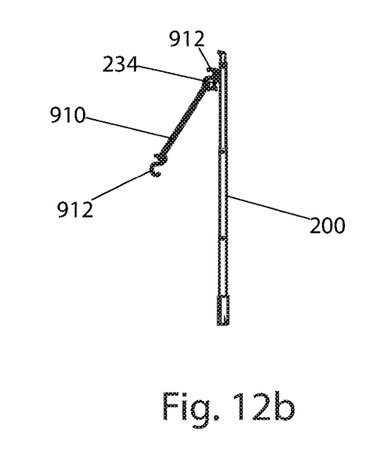
FIG. 12B is an in-use view of an extendable pole lifting a tie down for placement onto a tarp, according to an embodiment of the present invention.

The invention 100 may be operable to reposition a tarp 920. FIG. 12A illustrates the tarp 920 covering, the cargo 930 on the cargo trailer 900. The tie downs 910 may be coupled to the tarp 920 and pulled down to couple to the cargo trailer 900 in order to secure the tarp 920. As a non-limiting example, the tie downs 910 may be elastic cords. As shown in FIG. 12B, a hook 234 may be operable to grasp a tie down hook 912 and lift it up to attach to the tarp 920. Alternatively, the hook 234 may be operable to grasp the tie down hook 912 hanging from the elastic cord that is already coupled to the tarp 920 and to pull the tie down hook 912 down for attachment to the cargo trailer 900. The hook 234 on a top pole section 230 of the extendable pole 200 may also be operable to reposition the tarp 920 that covers the cargo 930 by hooking grommets or other apertures of the tarp 920 and pulling.

Figure 13A:
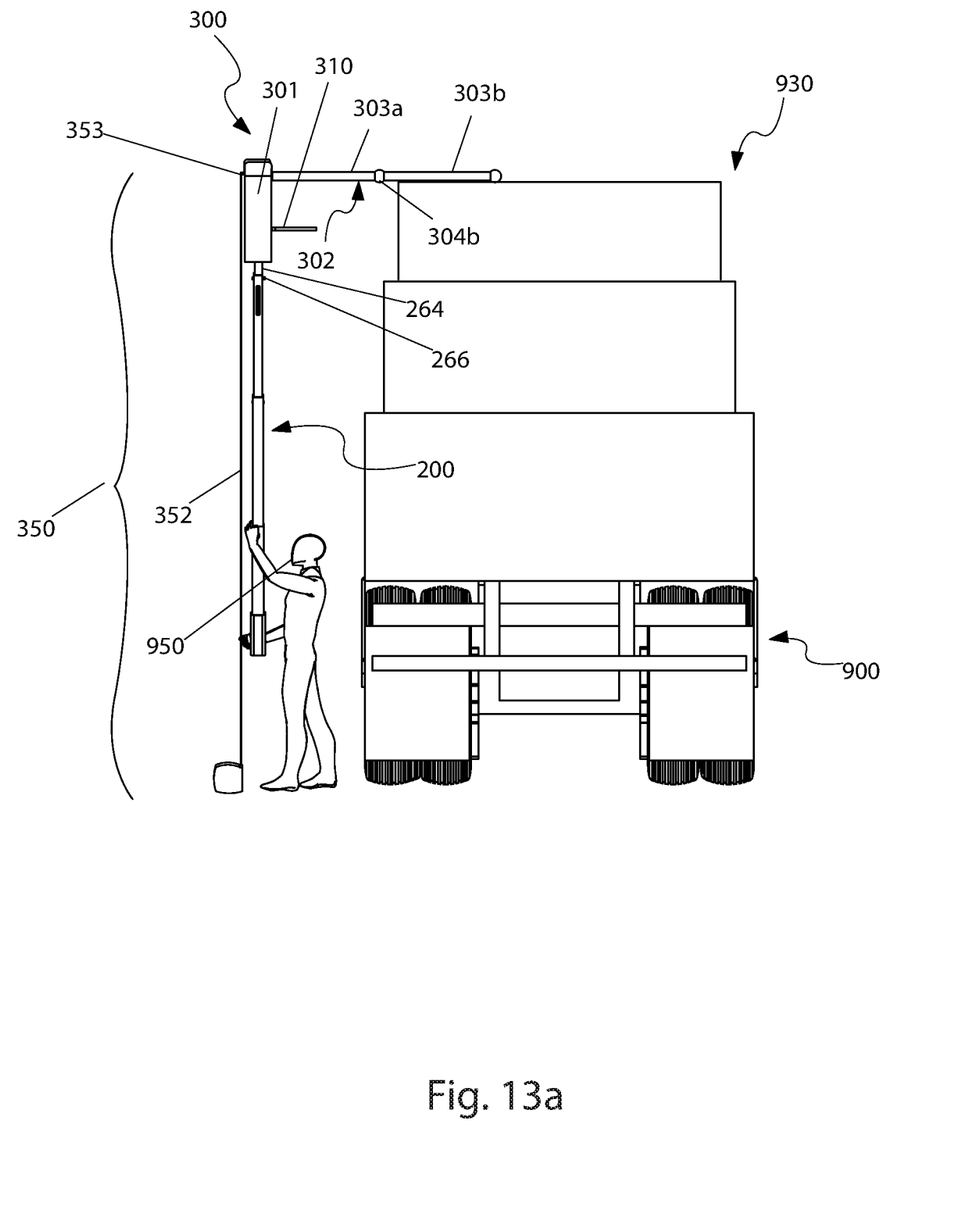
FIG. 13A is an in-use view of an extendable pole with a load measurement attachment lifting a tape of a retractable tape measure above a cargo and a rod fully extended away therefrom, according to an embodiment of the present invention; and, FIG. 13B is a close-up perspective view of the load measurement attachment with the tape measure attached and the rod fully collapsed, according to an embodiment of the present invention.
Figure 13B:
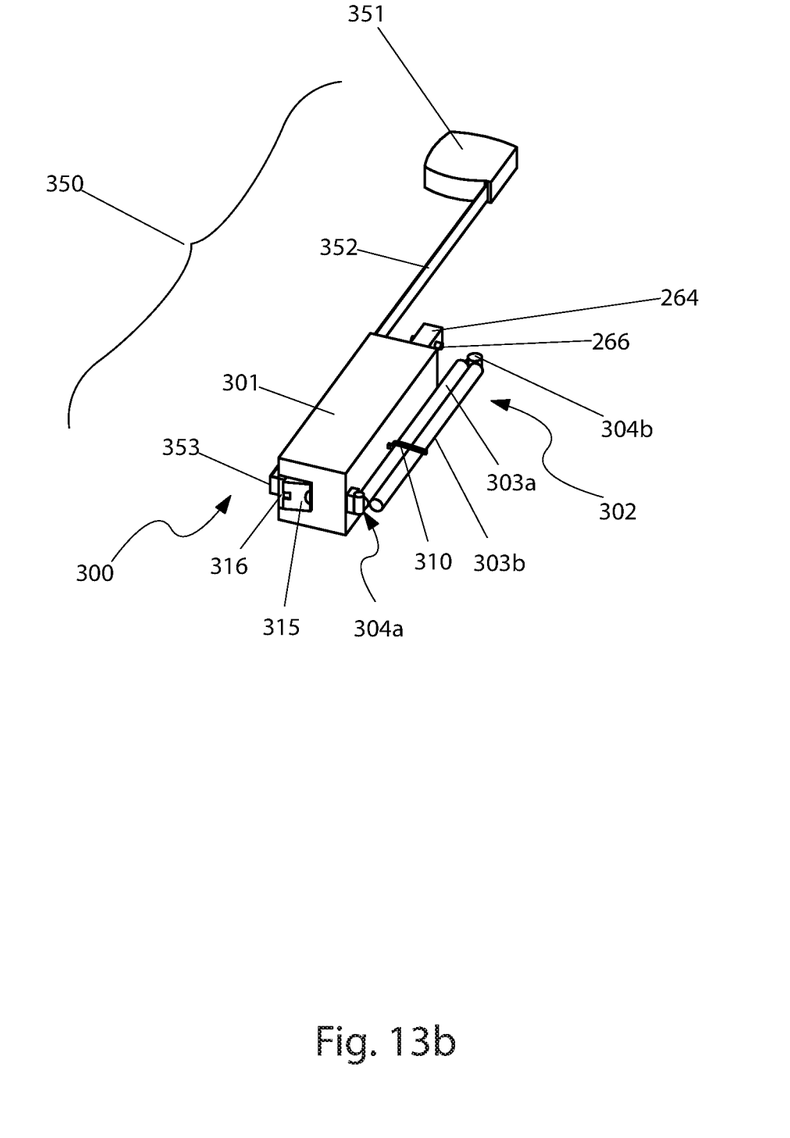

The invention 100 may be operable to measure a height of a cargo 930. FIG. 13A illustrates a user 950 grasping the extendable pole 200 with a load measurement attachment 300 attached to the top thereof, with the extendable pole 200 fully extended. A rod 302 is laterally extended from the load measurement housing 301 to suspend laterally over the cargo 130. A tape 352 of a retractable tape measure 350 is capable of being attached to the load measurement housing 301 and is capable of travelling with the extendable pole 200. As shown in FIG. 13B, the load measurement housing 301 is generally shaped as a rectangular prism, having a first end, a second end opposite said first end, a pair of opposing first sides, and a pair of opposing second sides. The first end may comprise an attachment base 264 and an attachment locking pin 266 located within the attachment base 264 to attach to the extendable pole 200. The second end has a catch 315 that is spring-loaded to be biased to be closed. Depression of one (1) side of the catch 315 forces the second side of the catch 315 upward to expose a gap 316. The location of the second side of the catch 315, and the gap 316, is at the edge of the second end and one (1) of the pair of first sides of the load attachment housing 310. The gap 316 is large enough to accept the tape measure tab 353 portion of the tape 352 of a tape measure 350. Release of the catch 315 entraps the tape measure tab 353 within the gap 316. Alternately, there may be another feature located within the gap 316 to positively attach, affix, or secure to the tape measure tab 353.

The rod 302 extends away from the opposing one (1) of the pair of first sides of the load attachment housing 301. The rod 302 includes a first hinge 304a hingedly attached to the load attachment housing 301 adjacent the edge of the second end opposite the gap 316, a first rod segment 303a hingedly attached to the first hinge 304a, a second hinge 304b hingedly attached to the first rod segment 303a, and a second rod segment 304b hingedly attached to the second hinge 304b. Either or both of the first and second hinges 304a, 304b are capable of locking or otherwise securing the relative positions of the rod segments 303a, 303b. Full extension of the rod segments 303a, 303b relative to the load attachment housing 301 results in a linear disposition, oriented perpendicular to the first side of the load attachment housing 301 and parallel to the deck of the cargo trailer 900. A clamp 310 is located on an intermediate position on the same one (1) of the pair of first sides of the load attachment housing 301 the rod 302 is attached. The clamp 310 is capable of securely clamping the rod 302, and more particularly, the first rod segment 303a and second rod segment 303b when fully collapsed.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A tie down placement device, comprising:
   an extendable pole lengthened to reach over a plurality of cargos the extendable pole having a bottom pole section, an intermediate pole section, and a top pole section, the top pole section includes an attachment aperture;
   a plurality of attachments each altering a distal end of the extendable pole to enable the extendable pole to perform one of a plurality of tasks necessary for securing cargo;
   an intermediate locking pin located on a proximal end of the intermediate pole section to engage a bottom locking aperture located at a proximal end of the bottom pole section when the intermediate pole section is extended such that the intermediate locking pin and the bottom locking aperture align;

a top locking pin located on a proximal end of the top pole section to engage an intermediate locking aperture located at a distal end of the intermediate pole section when the top pole section is extended such that the top locking pin and the intermediate locking aperture align; and a hook located on the distal half of the top pole section to manipulate a tie down;

wherein one of the attachments are removably coupled to a distal end of the top pole section via the attachment aperture.

2. The tie down placement device, according to claim 1, wherein the bottom pole section, the intermediate pole section, and the top pole section telescopically couple such that the top pole section slides within the intermediate pole section and the intermediate pole section slides within the bottom pole section.

3. The tie down placement device, according to claim 1, wherein the top pole section is smaller than the inside dimensions of the intermediate pole section and the outer dimensions of the intermediate pole section are smaller than the inside dimensions of the bottom pole section.

4. The tie down placement device, according to claim 1, wherein the bottom pole section, the intermediate pole section, and the top pole section lock into place to prevent the extendable pole from collapsing when extended.

5. The tie down placement device, according to claim 1, wherein the bottom pole section includes a grip for a person to hold the proximal end of the extendable pole.

6. The tie down placement device, according to claim 1, wherein the extendable pole is shortened to take up less space for storage.

7. The tie down placement device, according to claim 1, wherein the length of the extendable pole when fully extended is at least eight feet six inches.

8. The tie down placement device, according to claim 1, wherein the attachments alter the distal end of the extendable pole to enable the extendable pole to perform one of the tasks necessary for securing the cargo.

9. The tie down placement device, according to claim 1, wherein the attachments enable the extendable pole to toss a cargo strap, to pull the cargo strap, or lift a hard corner of the cargo.

10. The tie down placement device, according to claim 1, wherein the intermediate locking pin prevents further movement of the intermediate pole section relative to the bottom pole section until the intermediate locking pin is disengaged from the bottom locking aperture.

11. The tie down placement device, according to claim 1, wherein the intermediate locking pin disengages the bottom locking aperture when the intermediate locking pin is pressed towards the center of the intermediate pole section while sliding the intermediate pole section to misalign the intermediate locking pin and the bottom locking aperture.

12. The tie down placement device, according to claim 1, wherein the top locking pin prevents further movement of the top pole section relative to the intermediate pole section until the top locking pin is disengaged from the intermediate locking aperture.

13. The tie down placement device, according to claim 1, wherein the top locking pin disengages the intermediate locking aperture when the top locking pin is pressed towards the center of the top pole section while sliding the top pole section to misalign the top locking pin and the intermediate locking aperture.

14. The tie down placement device, according to claim 1, wherein the hook is a pair of hooks with a first open gap facing the distal end of the extendable pole and a second open gap facing the proximal end of the extendable pole.

15. The tie down placement device, according to claim 14, wherein the hook comprises a nautical cleat hook.

16. The tie down placement device, according to claim 1, wherein one of the attachments is a loop attachment.

17. The tie down placement device, according to claim 1, wherein one of the attachments is a scoop attachment.

18. The tie down placement device, according to claim 1, wherein the tie down placement device manipulates a tie down of a cargo trailer.

19. The tie down placement device, according to claim 18, wherein the trailer tie down is a device selected from the group consisting of a cargo strap, a cargo chain, or an elastic cord.

* * * * *